Figure 1:
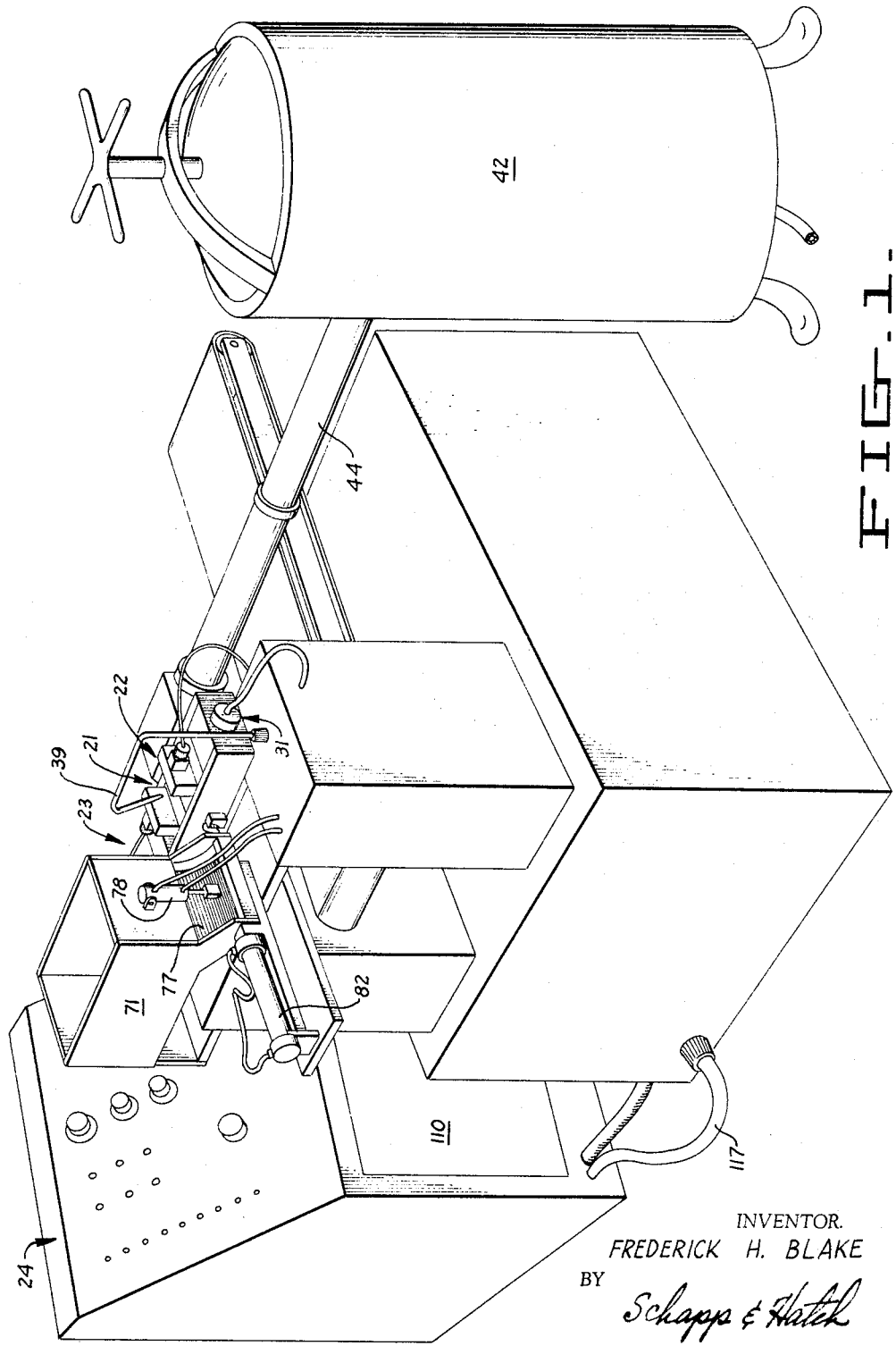

Oct. 26, 1965  F. H. BLAKE  3,213,486
MOLDING MACHINES
Filed Dec. 31, 1962  8 Sheets-Sheet 1

INVENTOR.
FREDERICK H. BLAKE
BY
Schapp & Hatch
ATTORNEYS

Oct. 26, 1965  F. H. BLAKE  3,213,486
MOLDING MACHINES
Filed Dec. 31, 1962  8 Sheets-Sheet 3

INVENTOR.
FREDERICK H. BLAKE
BY Schapp & Hatch
ATTORNEYS

Oct. 26, 1965  F. H. BLAKE  3,213,486
MOLDING MACHINES

Filed Dec. 31, 1962  8 Sheets-Sheet 4

INVENTOR.
FREDERICK H. BLAKE
BY
Schapp & Hatch
ATTORNEYS

United States Patent Office 3,213,486
Patented Oct. 26, 1965

3,213,486
MOLDING MACHINES
Frederick H. Blake, San Mateo, Calif.
(877 Cowan Road, Burlingame, Calif.)
Filed Dec. 31, 1962, Ser. No. 249,969
16 Claims. (Cl. 17—1)

This invention relates to improvements in molding machines and more particularly to machines adapted for forming ground meat food products and the like into a desired shape on a stick handle.

In recent years sales or processed foods have increased enormously. This has liberated the housewife from her traditional chores of paring, cutting, chopping, grinding, mixing and otherwise preparing foodstuffs for cooking and eating. With the advent of the widespread use of frozen food cabinets in the store and in the home, the market for processed foods has increased still further.

In order to make it possible to sell processed foods at attractive prices, it is necessary for the processor to carry out the preparatory operations on the food product in a rapid and efficient manner requiring a minimum of handling. In other words, the preparation of the foodstuffs should be automated as much as possible.

Because of minimum weight laws and the relatively narrow profit margins upon which food processors operate, it is essential that the weight of the particular product be precisely controlled. Hence the automatic machinery must be capable of providing such precise control without shutting down or otherwise interrupting the continuous flow of the processed food product. It is also highly desirable that the machine be essentially self-clearing in case of malfunction so as not to unduly diminish the amount of food product which can be handled by the machine in a given time period.

One type of automatic food processing machinery in which the above described properties are particularly important is equipment for high-speed forming and molding of food products onto a stick-like handle. Various types of foods such as meats, fish, potatoes, vegetables and mixtures may be processed in this manner, so long as the food used can be reduced to a macerated, moldable consistency. The particular foods or combinations of foods may vary widely but the molding of such foods onto a handle presents common problems.

A food product of the type described which is finding increasingly widespread acceptance is a seasoned mixture of ground meat such as veal pressed into the approximate shape and size of a chicken drumstick around one end of a wooded stick. Such product is commonly referred to as "mock chicken legs" or "breaded veal drumsticks," and the apparatus of the present invention is particularly adapted for the rapid and precise molding of products of this character.

It is therefore a principal object of the present invention to provide a machine for rapidly and precisely molding ground meat food products and the like into a desired shape on a stick-like handle.

Another object of the invention is to provide a food product molding machine capable of producing "mock chicken legs" and the like at a high rate of speed and with provision for precisely controlling the quantity of meat mixture without interrupting or slowing down production.

A further object of the invention is to provide a molding machine of the character described in which the molding means is formed and positioned to promote rapid and effective dropping of the molded article out of the mold means upon completion of the molding operation.

A still further object of the invention is to provide a molding machine of the character described in which the food product and the handle are inserted into an elongated mold cavity from opposite directions, so as to speed up the molding action and insure a uniform product.

Another object of the invention is to provide a molding machine of the character described in which the cycle of operation is effected by actuating the various components in sequentially occurring periods of adjustable duration from a central control.

Further objects and advantages of my invention will be apparent as the specification progresses, and the new and useful features of my molding machines will be fully defined in the claims attached hereto.

Figure 2:
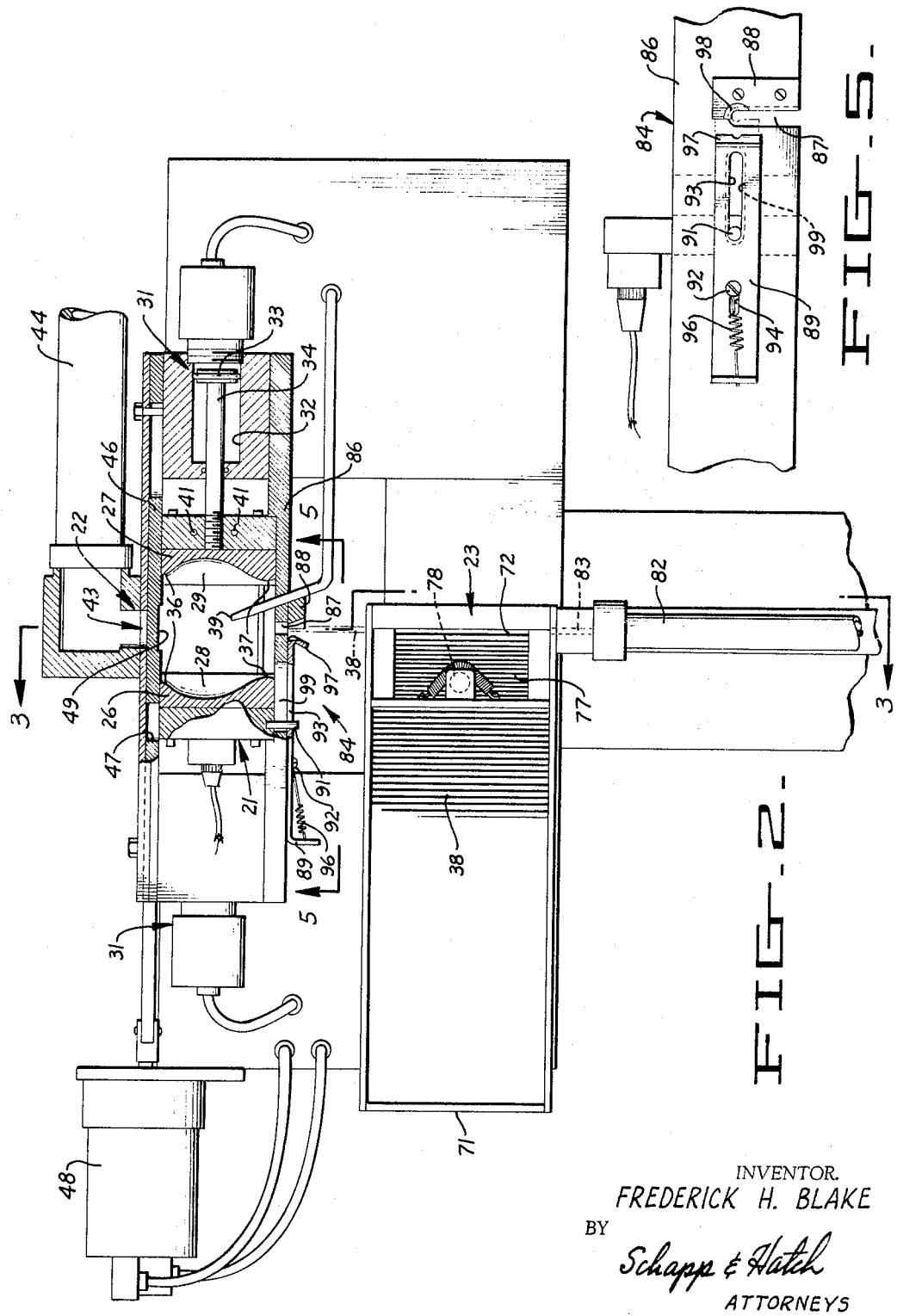
Figure 3:
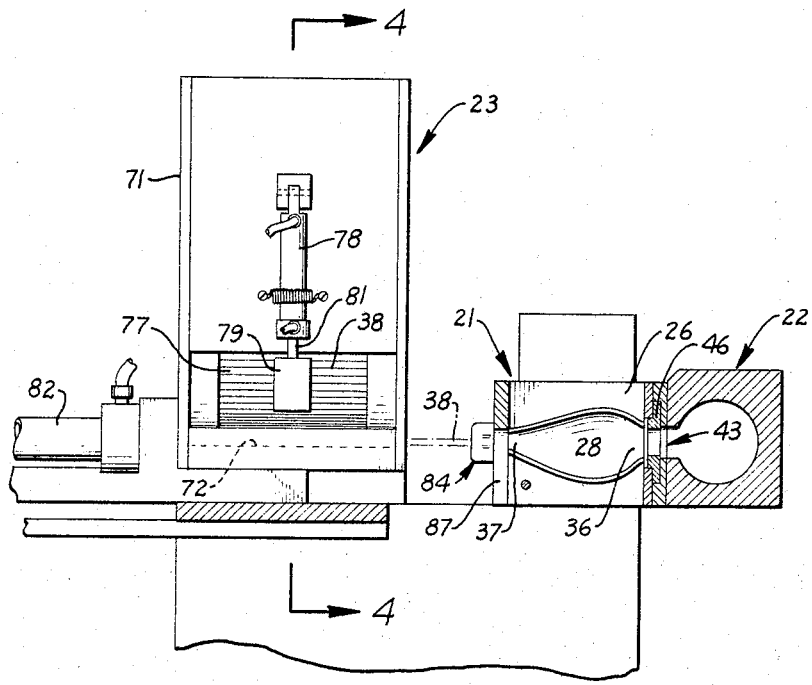
Figure 4:
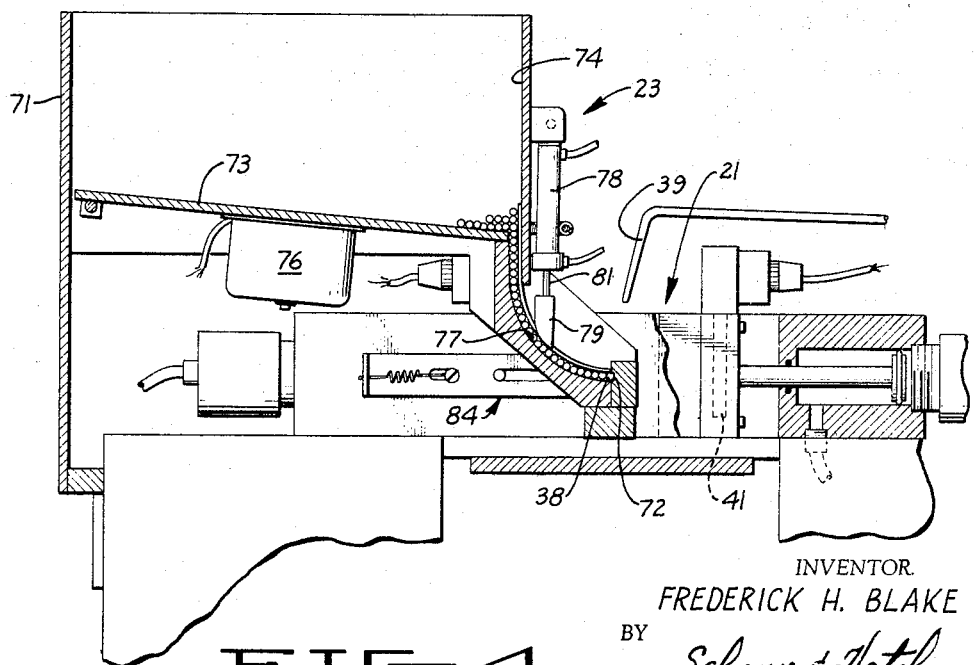
Figure 6:
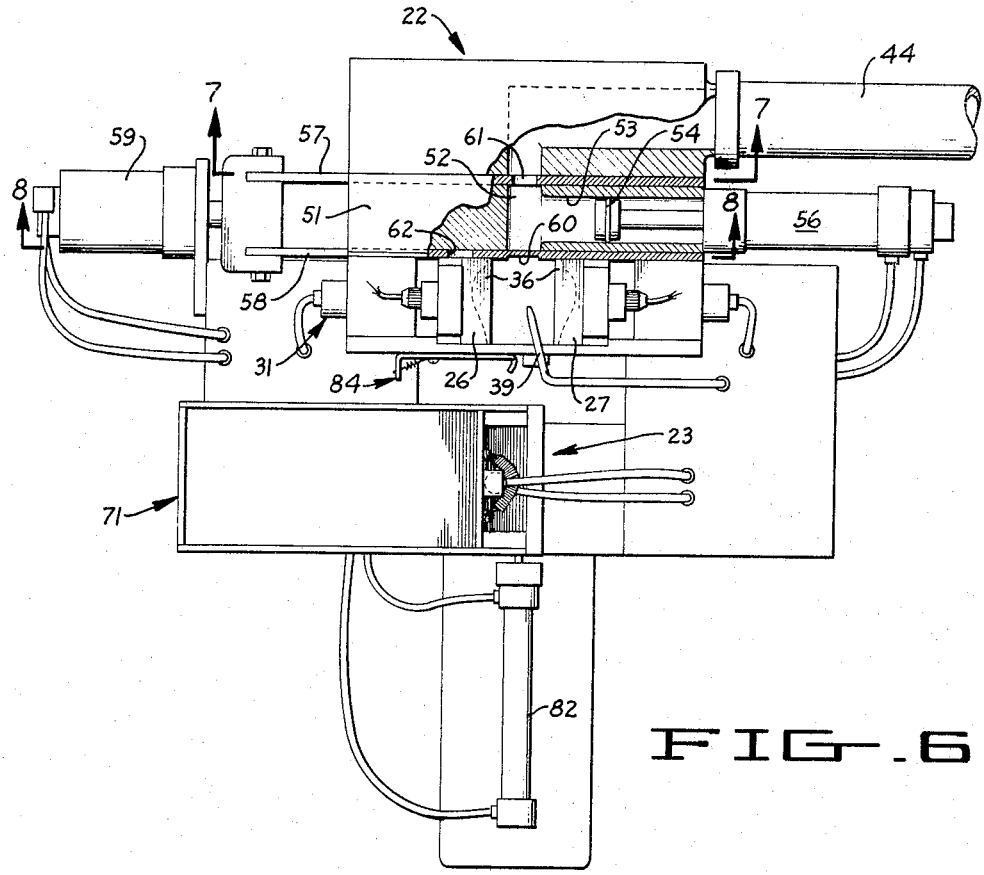
Figure 7:
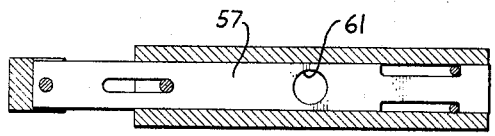
Figure 8:
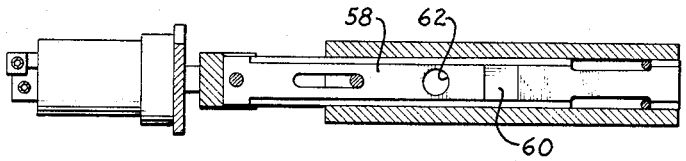
Figure 9:
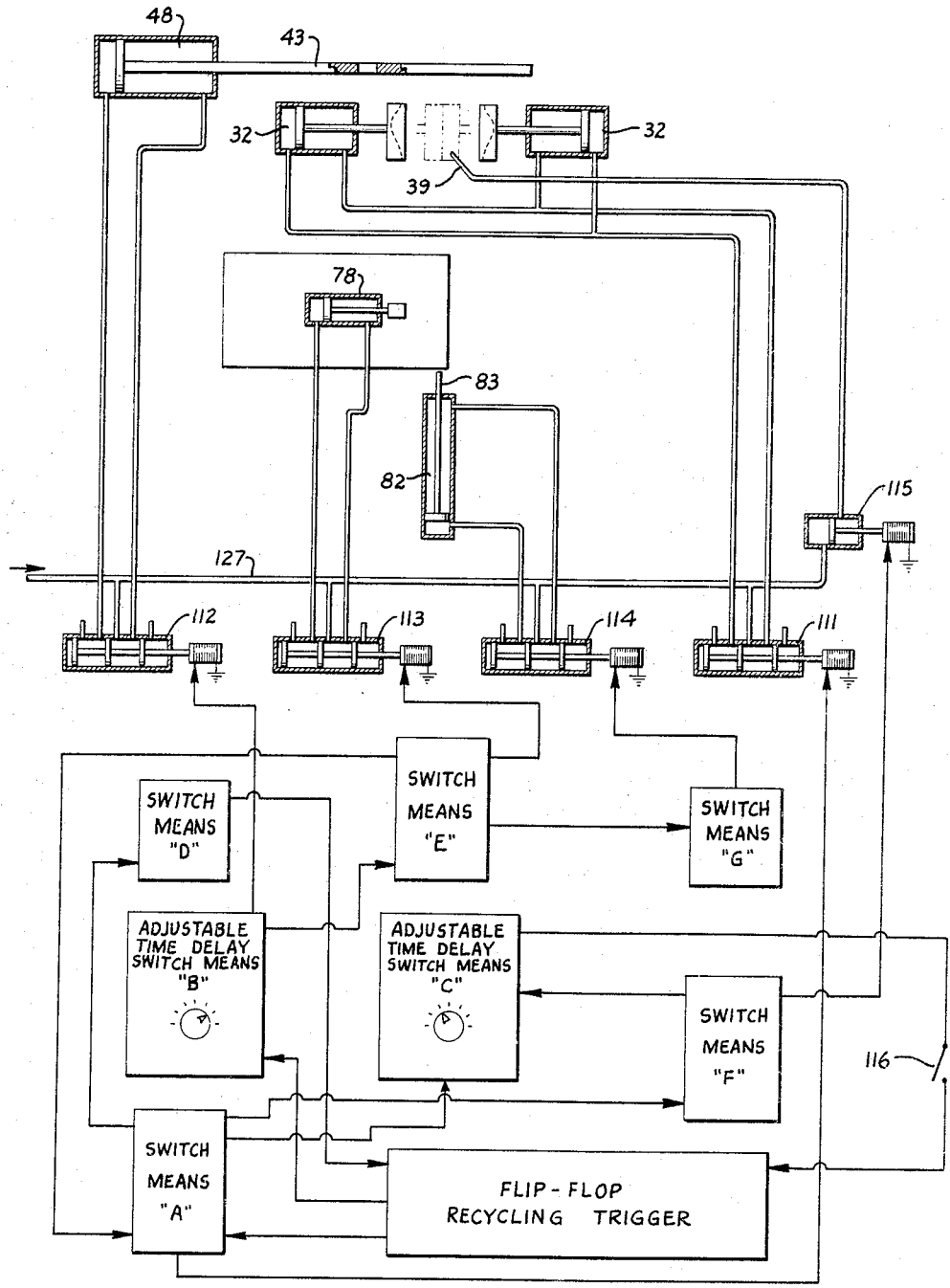
Figure 10:
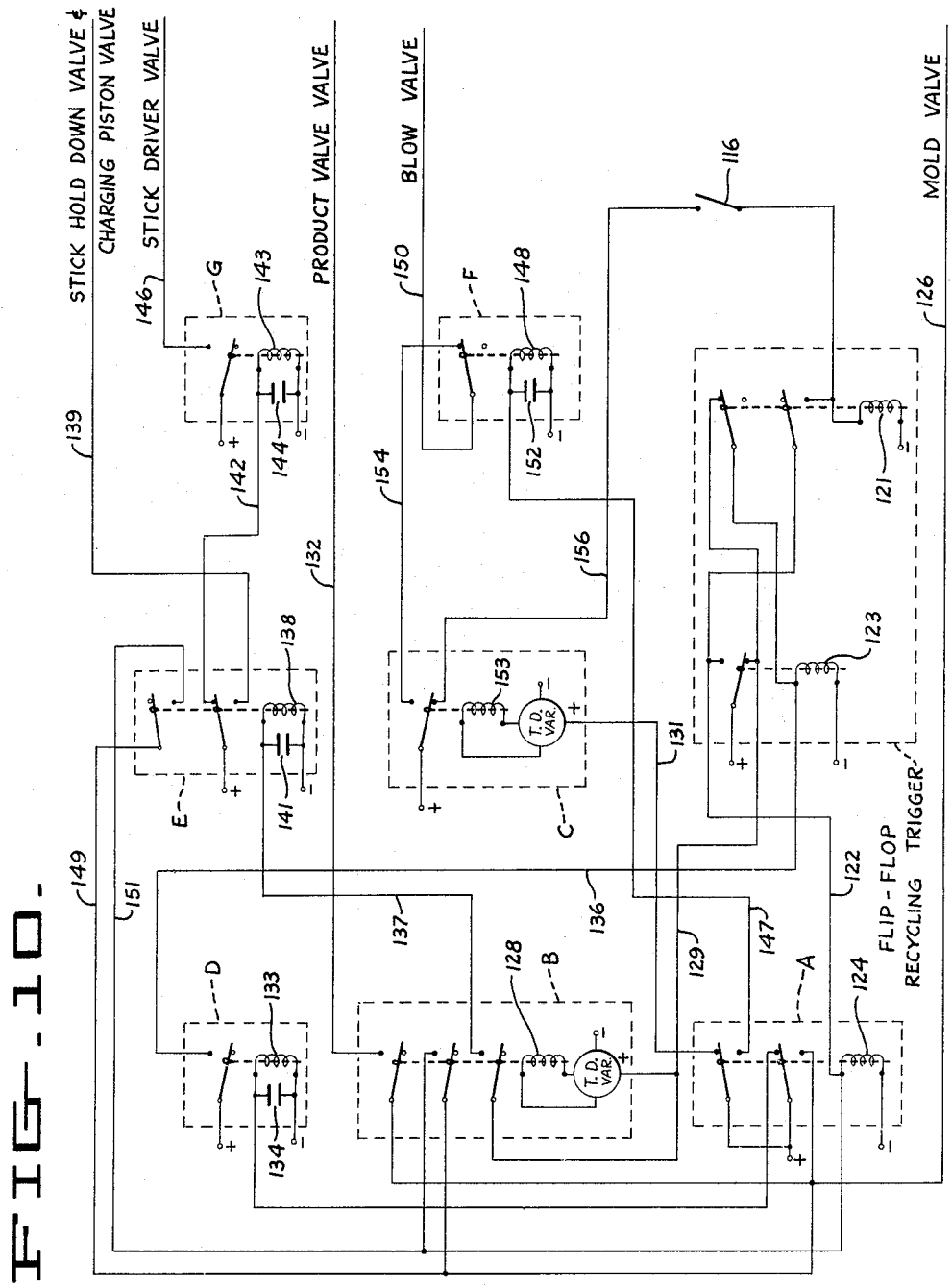
Figure 11:
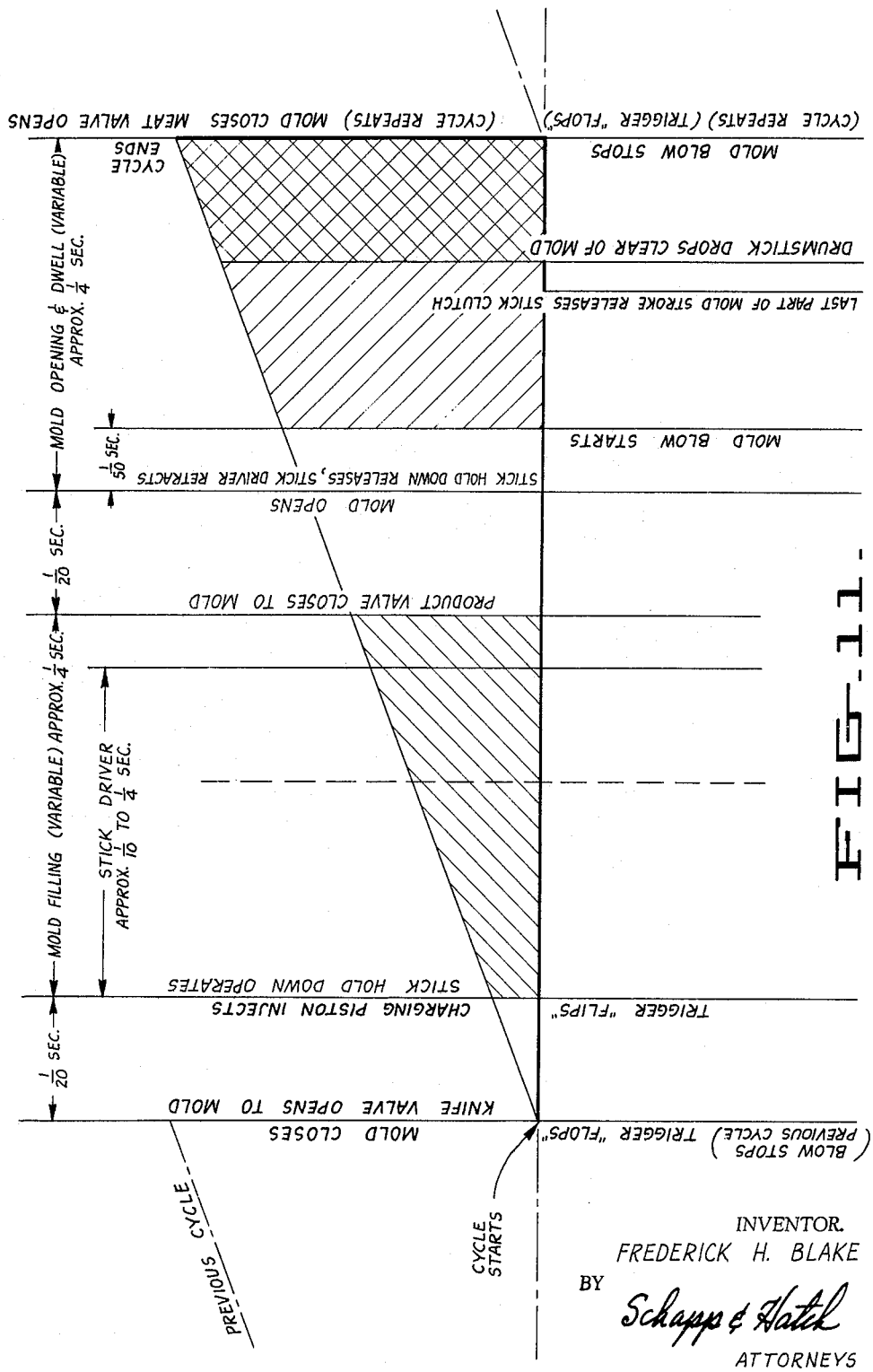
Figure 12:
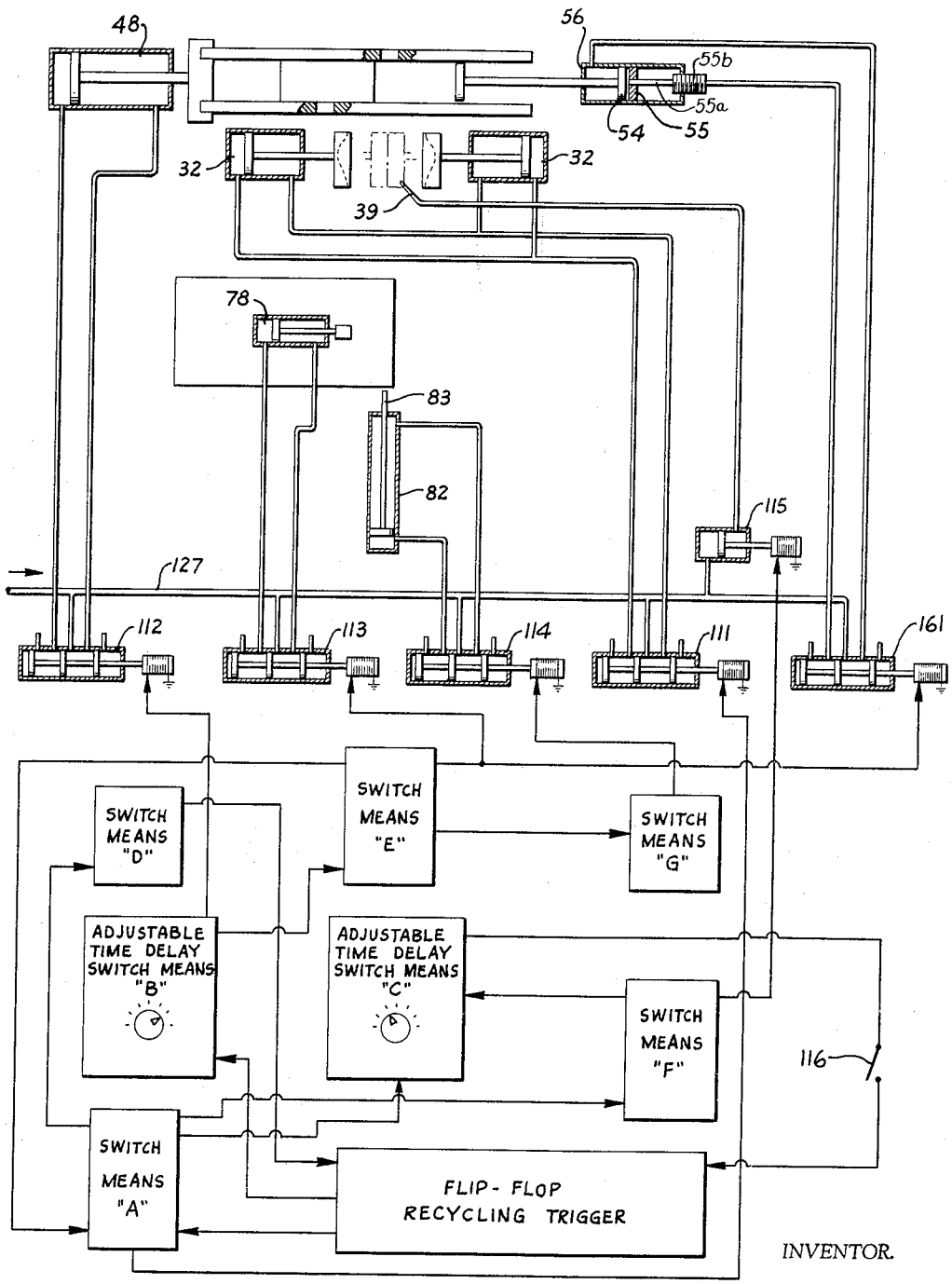

The preferred form of my invention is illustrated in the accompanying drawings forming part of this specification in which:

FIGURE 1 is a perspective view of a molding machine constructed in accordance with the present invention;

FIGURE 2, an enlarged plan view of the molding portion of the machine of FIGURE 1 with portions being broken away and shown in cross-section for clarity of illustration;

FIGURE 3, a fragmentary cross-sectional view taken substantially on the plane of line 3—3 of FIGURE 2;

FIGURE 4, a fragmentary cross-sectional view taken substantially on the plane of line 4—4 of FIGURE 3;

FIGURE 5, a fragmentary cross-sectional view taken substantially on the plane of line 5—5 of FIGURE 2;

FIGURE 6, a view taken similarly to that of FIGURE 2 but illustrating a modified form of the machine;

FIGURE 7, a fragmentary cross-sectional view taken substantially on the plane of line 7—7 of FIGURE 6;

FIGURE 8, a fragmentary cross-sectional view taken substantially on the plane of line 8—8 of FIGURE 6;

FIGURE 9, a schematic view of the actuating portions of the machine illustrated in operative association with a diagrammatic representation of the functions of the control circuits;

FIGURE 10, a circuit diagram of a control means forming part of the present invention;

FIGURE 11, a graphic depiction of the interrelationship between the actuation times for the various operative elements of the machine as controlled by the timing circuits; and FIGURE 12, a view similar to that of FIGURE 9 but showing a modified form of the invention.

While I have shown only the preferred forms of my invention, it should be understood that various changes or modifications may be made within the scope of the claims attached hereto without departing from the spirit of the invention.

Referring to the drawings in greater detail, it will be seen that the machine of the present invention consists essentially of a mold means 21 adapted for receiving and forming the food product into a desired shape, a charging means 22 formed for injecting a measured quantity of the food product into the mold means, a stick-driver means 23 associated with the mold means 21 and having provision for inserting an elongated stick end-first into the food product contained in the mold cavity, and a control means 24 operable for actuating the mold means 21, the charging means 22 and the stick-driver means 23 operating in such manner that the food product will be formed into a desired shape and the stick inserted thereinto in sequentially occurring periods of adjustable duration.

As may best be seen in FIGURE 2 of the drawings, the mold means 21 includes a pair of mold members 26 and 27 mounted for movement together and apart and having confronting vertical faces formed with aligned pockets 28 and 29 defining a mold cavity when the mold members are together. Actuating means 31, for urging the mold members 26 and 27 horizontally together and apart, is provided by opposed, double-acting pneumatic cylinders 32 containing pistons 33 connected by rods 34 to one or the other of the mold members 26, 27.

The molding machine of the present invention is here illustrated as being set up for making mock chicken legs. To this end the pockets 28–29 in the mold members 26–27 are formed in the manner illustrated in FIGURES 2 and 3 of the drawings, that is, each pocket is horizontally elongated and is larger at one end than the other in a manner simulating a chicken drumstick. As a feature of the invention, a measured quantity of the food product is injected into the mold cavity through one end thereof while the stick is inserted through the opposite end of the mold cavity. This feature is important in speeding up the action of the machine because, when the mold members 26–27 are pulled apart by the actuating means 31, the molded food product will drop out of the mold cavity and will clear the mold members much more quickly than would be the case if the product were oriented in another position, such as a vertical position; the product having less distance to fall to clear the mold members when the cavity is oriented horizontally.

As here shown, the pockets 28–29 are formed at their larger ends with relieved portions 36 which cooperate to define a passage for the entry of the food product to be molded. Likewise, the pockets 28–29 are formed at their smaller ends with relieved portions 37 which cooperate to define a passage for the endfirst entry of the stick handle 38. Conveniently, the stick handles 38 may consist of simple wooden skewers.

The rapid dropping out of the molded food product from the mold cavity is preferably aided by a downwardly directed air blast emanating from a nozzle 39 mounted above the mold means. The nozzle 39 is positioned to direct a blast of air downwardly against the molded food product just after the mold members 26–27 are urged apart by the means 31.

The rapid dropping out of the molded product can be aided materially by heating the mold members 26–27 sufficiently to cause a surface melting of the fat contained in the meat product being molded, and this tends to prevent adherence of the molded product to the surface of the mold pockets 28–29. As here shown, the heating of the mold members may be accomplished by the provision of electrical resistance heating elements such as Calrod units 41 embedded in the mold members, the units 41 being connected to a suitable source of electrical energy.

Additionally, the rapid dropping out of the molded product can be enhanced by providing the pockets 28–29 of the mold members 26–27 with a coating of polytetrafluoroethylene. The inherent slipperiness of this material, together with its extreme chemical inertness to food acids and the like, materially aids in the separation of many types of foods from the mold cavity surfaces. The coating of polytetrafluoroethylene, or Teflon, may be applied by any of several processes well known in the art.

The charging means 22 is adapted for injecting the product to be molded into the mold cavity through the passage 36 in precisely measured quantities. In the form of the invention illustrated in FIGURES 1 through 3, the charging means 22 consists of a suitable means 42 for supplying the food product to the mold means at a constant pressure, together with a product valve 43 capable of permitting flow through the passage 36 in a first terminal position and cutting off flow through said passage in a second terminal position. The control means 24 is adapted for actuating the valve 43 to its first terminal position at a predetermined point in the cycle of operation of the machine and to actuate the valve 43 to its second terminal position a timed interval thereafter. As will be apparent, with the product being supplied at a constant pressure and with the valve 43 moving between its open and closed positions at precisely timed intervals, the quantity of meat entering the mold cavity through the passage 36 during each cycle of operation will be precisely the same as the amount of meat entering during any other cycle of operation.

The supply means 42 may consist of any suitable pumping means capable of supplying the product at a constant pressure. As here shown, the means 42 consists of a conventional sausage stuffer machine which is supplied in the form of a large tank having a floating piston (not shown) actuated by air under pressure to displace the food product from the tank through the supply conduit 43 in a manner well understood in the sausage making art.

In the form of the invention shown in FIGURES 1–3, the product valve 43 may be termed a shear plate valve and consists of an elongated plate 46 mounted for endwise reciprocation across the passage 36 at its juncture with conduit 44. Valve plate 46 is provided with an opening 47 therethrough which registers with the passage 36 when the valve plate 46 is in the previously mentioned first terminal position and which moves a sufficient distance to shut off conduit 44 from passage 36 when the valve plate 46 is in its second terminal position. Conveniently, the valve plate 46 is actuated by a double-acting pneumatic cylinder 48.

Control over the quantity of food product being injected into the mold is obtained in the form of the charging means 22 described above, by varying the length of time during which the shear plate valve is in its first terminal position, that is, when the opening 47 is registered with the passage 36. Thus, if the molded product is slightly lighter than desired, the interval may be lengthened very slightly to increase the quantity of food product injected into the mold. Similarly, if the product is too heavy, the interval may be shortened and the quantity reduced by suitable manipulation of the control means 24. The manner in which this adjustment in the duration is accomplished is described in more detail in the section of the specification relating to the control means 24.

When molding certain types of food products, especially fairly fibrous meats, it is necessary that the valve 43 be effective to sever any fibers which may remain at the valve portal. This effect is here provided by forming the portion of the plate 46 surrounding the opening 47 of a hard, chemically resistant material, such as stainless steel, and by providing a sharp rim encircling the opening 47 and a cooperating sharp rim surrounding the confronting passage leading to conduit 44. The resulting shearing of the fibers also cooperates in promoting the rapid falling out of the molded product from the mold cavity as the mold members 26–27 move apart. This action is also facilitated by relieving the valve plate 46 to provide a shallow depression 49 on the face of the plate in position to confront passage 36 when the plate is in its second terminal position, see FIGURE 2 of the drawings.

In the form of the invention illustrated in FIGURES 6, 7 and 8, the charging means 22 does not depend on the length of time in which the valve supplying product to the mold chamber is open to supply a measured quantity of food product to the mold, but rather incorporates a charging cylinder adapted to take in a measured quantity of the product and inject it into the mold cavity at the proper time. To this end, the charging means of FIGURE 6 includes a housing 51 having an internal passage 52 adapted for connection between the food product supply conduit 44 and the entrance passage 36 of the mold cavity.

A cylindrical bore is formed in the housing 51 with one end of the bore opening into the pasasge 52, and a piston 54 is mounted for reciprocation in the bore 53 by a double-acting pneumatic cylinder 56. A pair of elongated shear plate valve members 57 and 58 are mounted for endwise reciprocation in parallel spaced relation in the housing 51 on opposite sides of the bore 53 and transversely across the ends of the passage 52. The valve members 57–58 are jointly reciprocated between first and second terminal positions by a double-acting pneumatic cylinder 59 and are provided, respectively, with openings 61 and 62 positioned to provide communication from conduit 44 to bore 53 while the valve members 57–58 are in a first terminal position and to provide communication between bore 53 and mold cavity passage 36 when the valve members 57–58 are in their other terminal position.

The control means 24 is effective for actuating the pneumatic cylinders 56 and 59 in sequence. Cylinder 59 is initially actuated to move the valve members 57–58 to their first terminal position to admit a measured quantity of the food product to the bore 53 while at the same time blocking off the bore from the mold cavity passage 36. The food product, being supplied through conduit 44 under pressure, will enter bore 53 until it is completely full. The pneumatic cylinder 59 is then actuated to urge the valve members 57–58 to their second terminal position communicating the bore 53 with the mold cavity passage 36 and blocking off the conduit 44 from the bore 53. Thereafter, the pneumatic cylinder 56 is actuated to advance the piston 54 a measured distance in the bore 53 so as to inject the measured quantity of product into the mold cavity.

Control of the quantity of product injected into the mold cavity is obtained by varying the stroke of piston 54 and thus the amount of product it displaces. For this purpose, a conventional variable stroke pneumatic cylinder such as that manufactured by the Ortman-Miller Machine Co., Inc. of Hammond, Indiana, and shown in their Bulletin No. 101A, may be used to actuate piston 54. With this system, increasing or decreasing the length of stroke of piston 54 by retracting or advancing adjustable member 55, see FIGURE 12, will correspondingly increase or decrease the weight of the individual mock chicken legs. As shown in FIGURE 12, retracting and advancing the adjustable stop member 55 is accomplished by mounting member 55 on a rod 55a secured to a member 55b threaded in the end of the pneumatic cylinder 56.

The shear plate valve members 57–58 are preferably formed similar to the valve plate 46, that is, with cooperative sharp rims surrounding the openings 61 and 62 and cooperating with sharp rims surrounding the passage 52 adjacent to the members 57–58 to shear the food fibers. Also, the member 58 may be formed with a shallow depression 60 corresponding to the depression 49 in valve plate 46. The configuration of the valve members 57–58 may be seen in FIGURES 7 and 8 of the drawings, respectively.

As shown in FIGURES 1 through 5 of the drawings, the stick-driver means 23 is adapted for inserting an elongated stick 38 endfirst through the passage 37 into the food product contained in the mold cavity. The stick-driver means here includes a box-like reservoir 71 formed to contain a supply of sticks and to deliver them in one-at-a-time order to a trough 72 which is aligned with the passage 37 defined by the mold members 26–27 in closed position. The floor 73 of the reservoir is inclined downwardly toward the end 74 of the reservoir confronting the trough 72, and the sticks are preferably urged into such end by the action of a vibrator 76 mounted on the floor 73. When the sticks reach end 74 they drop downwardly in side-by-side relation along a curved ramp 77 and into trough 72.

In order to be sure that the stick 38 lies in proper position in trough 72, I prefer to provide a hold-down device in the form of a small, vertically disposed double-acting pneumatic cylinder 78 having a stick-engaging shoe 79 mounted at the end of its piston rod 81. The cylinder 78 is supplied with air to hold shoe 79 down against the sticks in ramp 77 during the time the lowermost stick is being urged endwise through trough 72 and into the mold cavity.

The endwise movement of the stick 38 is accomplished by a double-acting pneumatic ram 82 aligned with the trough 72 and having a plunger 83 capable of engaging the rear end of the stick and shoving it endfirst through the trough and through passage 37 into the mold cavity. As will be explained more fully, the control means 24 actuates the ram 82 when the mold members 26–27 are together and a desired quantity of food product has entered the mold cavity.

A releasable clutch means 84 is provided for holding the stick 38 in its inserted position in the mold cavity until the mold members 26–27 are moved apart. The clutch means 84 may best be seen in FIGURES 2 and 5 of the drawings. The structural member 86 which supports the mold means 21 is formed with a slot 87 through which the stick can pass from trough 72 through passage 37 into the mold cavity. Secured at one side of slot 87 is an anvil plate 88 which is cooperative with a holding bar 89 mounted, by means of pins 91 and 92 and slots 93 and 94, for endwise reciprocation toward and away from the anvil member 88. A spring 96 is connected between pin 92 and bar 89 and is biased to urge the bar in the direction of the anvil 88.

When pneumatic ram 82 is actuated to drive the stick 38 toward the mold cavity, the forward end of the stick will be inserted between the anvil 88 and the confronting end 97 of bar 89, the spring 96 being biased to urge the bar 89 toward the anvil, thus clamping the stick between the bar end 97 and anvil 88. To facilitate entry of the stock between bar 89 and anvil 88, the end 97 of the bar is bent backwardly at an angle and the confronting edge 98 of the anvil is chamfered to provide a funneling effect.

The pin 91 is secured to mold member 26 and moves horizontally therewith in a slot 99 formed in member 86 and in the slot 93 provided in bar 89. The slot 93 is somewhat shorter than slot 99 so that pin 91 will engage the end of slot 93 and move the bar 89 away from the anvil 88 as the mold member 26 is retracted. Thus it will be seen that the clutch means 84 will hold the stick during the initial separation of the molded product from the mold pockets 28–29 and will thereafter release the stick so it can drop through slot 87 as the molded product is dropping from between the mold members 26–27.

In accordance with the present invention and as an important feature thereof, the control means 24 is operable to actuate the various components of the machine over sequentially occurring periods of adjustable duration. This control means provides a completely timed cycle of operation in which time periods are allotted for each of the mechanical components to function, the period being adjusted to a length sufficient to ensure that the mechanical function will occur. With this type of control system, the timing devices are located at a distance in a protective cabinet and no sensing devices are required at the worksite. This greatly promotes the longevity of the machine by eliminating limit switches and other similar sensing devices which could soon break down in the wet environment in which the present molding machine would most often be used.

As here shown, the mold actuating cylinders 32, the charging cylinder 48, the stick hold-down cylinder 78, and the stick-driver ram 82 are each operated by electrically operated solenoid valves 111, 112, 113 and 114, respectively. The valves 111–114 may be of any suitable solenoid-driven two-position type. These valves are schematically depicted in FIGURES 9 and 12 of the drawings which illustrate the manner in which the positioning of the valves controls the supply of air to their respective cylinders.

Each of the cylinders is of the double-acting type so that air under pressure supplied to the rear end will advance the piston toward the head end and air under pressure supplied to the head end of the cylinder will retract the piston to the rear end. The valves 111–114 are of the spring return type so that energizing of their solenoids will move the valve members to one valving position and de-energizing of the solenoids will cause the valve members to move to the other valving position under the influence of their self-contained springs.

The control means 24 includes control circuits for selectively energizing the solenoid valves 111–114. As here shown, the control circuits may conveniently be housed in a separate cabinet 110 separated from the rest of the apparatus and connected thereto by electrical control cables 117. In this manner the control cabinet may be positioned out of the way without adversely affecting the operation of the apparatus.

The control circuits consist basically of a series of switching means operatively connected to the solenoid valves 111–114, the switching means being interconnected in such manner as to assure the proper sequential operation of the valves for the proper time periods.

The function of the timing circuits is shown diagrammatically in FIGURES 9 and 12 of the drawings. The circuit of FIGURE 9 is adapted for providing a plurality of control signals to the solenoid valves 111–114 in a predetermined timed sequence. As here shown, the timing circuit includes a flip flop circuit having two stages, each of the stages being a stable state of operation. Also included in the timing circuit is a first switch means A which is coupled to one stage of the flip flop circuit to close in response to the triggering of this one stage, the closing of the first switch means A generating a first control signal to solenoid valve 111.

A first time delay switch means B is coupled to the other stage of the flip flop circuit to open in response to the triggering of the one stage. A second time delay switch means C is coupled to the first switch means A to open in response to the closing of the first switch means A, the opening of the first time delay switch means B generating a second control signal to the solenoid valve 112.

Coupled to the first switch means A is a second switch means D, the latter being adapted to open after a preset time delay in response to the closing of the first switch means A. In addition, the second switch means D is coupled to the other stage of the flip flop circuit to trigger the other state in response to the opening of the second switch means D.

A third switch means E is coupled to the first time delay switch means B so as to close in response to the opening of the first time delay switch means B, generating a third control signal to the solenoid valve 113. The first time delay switch means B is adapted to close in response to the triggering of the other stage of the flip flop circuit, and the closing of the first time delay switch means B opens the third switch means E after a preset time delay, generating a fourth control signal to the solenoid valve 114. A fourth switch means F is also coupled to the first switch means A to close in response to the closing of the first switch means A.

The first switch means A is connected to open in response to the opening of the third switch means E, the opening of the first switch means A closing the second time delay switch means C and opening the fourth switch means F which generates a fifth control signal to a solenoid valve 115 which supplies air to the blow-down nozzle 39.

Conveniently, a time delay may be provided to delay the actuation of solenoid valve 114 whereby the stick may be inserted into the mold at exactly the time desired. This is accomplished by the provision of a fifth switch means G which closes in response to the opening of the third switch means E and opens after a preset time delay, generating the fourth control signal to the solenoid valve 114.

The switching means A–G may be provided by any suitable control elements having the described characteristics. As here shown, these control elements consist of magnetic relays interconnected in such manner as to provide the described sequential operation. A typical circuit incorporating magnetic relays is illustrated in FIGURE 10 of the drawings. As seen therein, the relays constituting the switch means D, E, F and G are provided with capacitors connected in parallel with their coils. The value of these capacitors determines the time period during which the coils will remain energized to hold the relays in closed position. Thus the preset time described in connection with switch means D, E, F and G may be regulated simply by providing the correct capacitor.

The time delay switch means B and C are of a type well known in the art wherein the time period between receipt of a signal and the energizing of the coil may be controlled simply by rotating a control knob. I prefer to use variable (solid state) time delay relays having a range of $1/100$ sec. to 1 sec. such as the Agastat Solid State Time Delay Relay, Type 2705–A–3A, commercially available from Elastic Stop Nut Corporation of America, Elizabeth, New Jersey.

In operation, the relays are initially positioned as illustrated in FIGURE 10 of the drawings. When the cycle switch 116 is closed the coil of relay 121 of the flip flop circuit is energized to close the relay. This supplies current through lead 122 to the first switch means A. At the same time relay 121 cuts off the power supply to the coil of relay 123, causing the latter to open and the flip flop circuit to remain in one stable state of operation until the coil of relay 123 is energized.

The power supplied through lead 122 energizes the coil of relay 124, moving the relay to closed position. This generates the first control signal which energizes the solenoid valve 111 through lead 126. This displaces the valve member of valve 111 to supply air under pressure from conduit 127 to the rear side of actuating cylinders 32, thus urging the mold members 26–27 together to provide the mold cavity.

As previously stated, the first time delay switch means B is coupled to the other stage of the flip flop circuit to open in response to the triggering of the first stage, this being accomplished when the de-energizing of the coil or relay 123 causes the relay to move to open position, cutting off the flow of current through lead 129. The closing of relay 124 cuts off the current being supplied to the second time delay switch means C through lead 131. The described opening of relay 128 generates the second control signal in lead 132 to supply actuating current to the solenoid valve 112. This displaces the valve member to connect air supply conduit 127 to the rear end of cylinder 48, causing shear plate valve 43 to move into alignment with the entrance passage 36 of the mold cavity.

Closing of relay 124 cuts off the power being supplied to relay 133 in switch means D. Because of the presence of capacitor 134, the relay 133 will open after a preset time delay. The opening of relay 133 supplies current through lead 136 to relay 123 to trigger the flip flop circuit and cause it to assume its other stable state of operation.

Opening of relay 128 connects lead 129 to lead 127 which is in turn connected to the coil of relay 138 contained in switch means E. When relay 123 is energized through lead 136, it supplies power to lead 129. This power proceeds through lead 137 to energize solenoid 138 until such time as the time delay contained in switch means B completes its cycle, causing relay 128 to be energized. During the time delay period relay 138 is closed and this generates the third control signal, supplying power through lead 139 to solenoid valve 113, which then supplies air from conduit 127 to the rear end of holddown cylinder 78.

The closing of relay 128 in response to the triggering of the other stage of the flip flop circuit, and after the variable time delay period has elapsed, cuts off the supply of power through lead 137 to relay 138. Because of the capacitor 141 the relay 138 will remain closed for a preset time and will thereafter open. The opening of relay 138 generates the fourth control signal by supplying power through lead 142 to the coil of relay 143 contained in switch means G. Capacitor 144 will delay the opening of relay 143 until a preset time delay has elapsed after the opening of relay 138. The opening of relay 143 generates the fifth control signal by supplying power through lead 146 to solenoid valve 134, causing the latter to supply air to the rear end of stick-driver ram 82.

Closing of relay 124 also supplies power through lead 147 to the coil of relay 148 contained in switch means F, moving relay 148 to closed position. The opening of relay 138 cuts off the power being supplied through leads 149 and 151 of a holding circuit for relay 124, thus causing relay 124 to move to open position. The opening of relay 124 supplies power to the time delay switch means C, and cuts off the power being supplied to relay 148 through lead 147. Because of capacitor 152 a preset time delay will elapse before relay 148 opens and generates the fifth control signal by supplying power through lead 150 through the solenoid valve 115, causing the latter to supply air to the blow-down nozzle 39.

The coil of relay 153 in time delay switch means C will be energized to close the relay after the selected period of time has elapsed. The closing of relay 153 cuts off the current being supplied to switch means F through lead 154 and at the same time supplies current to lead 156 connected to cycle switch 116. So long as the cycle switch remains closed, this signal will again energize relay 121 and trigger the flip flop circuit to again initiate the described cycle of operation.

The solenoid valves 111–115, being of the spring return type, will move to their other terminal positions and supply air to the front side of their respective pneumatic cylinders when power is no longer being supplied to them through their respective leads 126, 132, 139, 146 and 150. The described circuitry will cause the energizing of the different solenoid valves in the desired sequentially occurring periods of adjustable duration.

The sequence and typical duration of these periods is illustrated graphically in FIGURE 11 of the drawings. As seen therein, the first control signal triggers the flip flop circuit, causing the actuating means 32 to close the mold and at the same time causing the knife valve 43 to move to its first terminal position to supply the product to the mold cavity. Approximately $\frac{1}{20}$ of a second later the flip flop circuit is triggered, resulting in the third control signal being supplied to the stick hold-down solenoid valve. This period of time is approximately that required for the mold members to close and the shear plate valve 43 to open. The length of time during which product is filling the mold is controlled by the time delay switch means B and as here shown will require approximately $\frac{1}{4}$ of a second. As mentioned above, this period is made variable in order to control the amount of product entering the mold. At the end of the variable period the second control signal ceases and the shear plate valve 43 immediately moves to closed position. At the same time the fourth control signal causes ram 82 to drive the stick handle into the product contained in the mold cavity.

In order to prevent the stick from being displaced to one side of the mold cavity by the incoming food product, I prefer to wait until the cavity has at least partially filled with the food product before inserting the stick handle. As shown in FIGURE 11, the stick driver begins to insert the stick simultaneously with the closing of the shear plate valve 43, that is, when the mold is full. It is possible, however, to speed up the action somewhat by selecting a condenser 144 which will supply the fourth control signal to the stick-driver solenoid valve 114 before the mold is completely full. As shown in FIGURE 11, the stick driver should be activated at least $\frac{1}{10}$ second to $\frac{1}{4}$ second after the product valve opens. In any event, the stick should not be inserted into the mold before at least a substantial amount of product has entered.

Approximately $\frac{1}{20}$ of a second after the second control signal ceases and the fourth control signal is generated, the first, third and fourth control signals cease, causing the mold to open, the stick hold-down to release, and the stick driver to retract.

Approximately $\frac{1}{50}$ of a second after this the fifth control signal is generated to start the mold blow-down through nozzle 39. This $\frac{1}{50}$ of a second delay between the opening of the mold and the beginning of the blow-down permits the mold to open slightly and avoids splattering the food product. Approximately $\frac{1}{8}$ of a second later the last part of the mold stroke releases the stick clutch 84, allowing the molded product to drop clear, this action taking on the order of $\frac{1}{100}$ of a second.

The cycle could end at this point but in order to provide for unexpected contingencies, I prefer to extend the time period approximately the amount shown in FIGURE 11. This provides a cycle duration of approximately $\frac{6}{10}$ of a second, resulting in a production rate of approximately 100 units of finished product per minute.

When the charging means 22 is of the form shown in FIGURES 6 and 12 of the drawings, that is, incorporating a charging cylinder, the lead 139 is connected to a solenoid valve 161, formed to supply air to cylinder 56, as well as to solenoid valve 114. Thus the charging piston 54 will operate to inject the measured quantity of product into the mold when the flip flop circuit is triggered the second time, approximately $\frac{1}{20}$ of a second after the cycle commences. The time delay switch means B should be set to allow sufficient time for the charge to be displaced into the mold.

From the foregoing it will be seen that I have provided a machine for molding food products into a desired shape onto a stick-like handle at a high rate of speed and with precise control of the quantity of food mixture. The configuration of the machine and the control means provided result in an extremely high unit production per minute as compared to previous food product molding apparatus.

I claim:

1. A machine for molding ground meat food products and the like onto a stick-like handle, comprising mold means having a mold cavity formed for receiving an end of a stick-like handle and for molding the food product into a desired shape thereabout, charging means formed for injecting a measured quantity of the food product into said mold cavity, stick-driver means mounted adjacent to said mold means and formed for inserting an elongated stick endfirst into the food product contained in the mold cavity, and control means operable for actuating said mold and charging means and stick-driver means whereby the food product will be formed into a desired shape and the stick inserted thereinto in sequentially occurring periods of adjustable duration.

2. A machine for molding ground meat food products and the like onto a stick-like handle, comprising mold means including a pair of mold members mounted for movement together and apart and having confronting vertical faces formed with aligned pockets defining a mold cavity when said mold members are together, said confronting vertical faces of the pair of mold members formed to define a passage communicating to the interior of the mold from the exterior thereof, actuating means for urging said mold members horizontally together and apart, charging means formed for injecting a measured quantity of the food product into said mold cavity, stick-driver means mounted in juxtaposed position to said mold means and oriented in relation to said mold means for inserting an elongated stick endfirst through the passage between the pair of mold members and into the food product contained in the mold cavity, and control means formed for operating said actuating and charging and stick-driver means in sequence whereby the food product will be formed into a desired shape and the stick inserted thereinto, the mold members being moved apart thereafter to permit the molded product to fall from the mold cavity.

3. A machine as defined in claim 2 and wherein said mold cavity is elongated and is positioned with its major dimension substantially horizontal, said charging means being formed for injecting the measured quantity of the food product into the mold cavity through one end thereof, and said stick-driver means being formed for inserting the stick through the opposite end of said mold cavity.

4. A machine as defined in claim 3 and wherein a nozzle adapted for connection to a source of air under pressure is mounted above said mold means in position to direct a blast of air downwardly against the molded food product to aid the latter in dropping from the mold cavity when the mold members are moved apart.

5. A machine as defined in claim 4 and wherein said mold members are provided with heating elements for elevating the temperature of the mold members sufficiently to cause melting of fat in the food product at the areas thereof in contact with the mold members so as to aid in preventing the food product from sticking in the mold.

6. A machine as defined in claim 4 and wherein the surfaces of said pockets in said mold members are formed with a coating of polytetrafluoroethylene for reducing sticking of the food product in the mold cavity.

7. In a machine having a device for supplying ground meat food products and the like under pressure for molding onto a stick-like handle, a mold means comprising a pair of mold members mounted for movement together and apart and having confronting vertical faces formed with aligned pockets defining an elongated horizontally oriented mold cavity when said mold members are together, and means for moving said members together and apart, said vertical faces of said mold members being formed to cooperatively define horizontal passages communicating the opposite ends of said mold cavity with the exterior of the mold whereby the food product may be injected through the passage at one end of the mold cavity and the stick may be inserted endfirst into the cavity through the passage at the opposite end.

8. A machine for molding ground meat food products and the like onto a stick-like handle, comprising mold means including a pair of mold members mounted for movement together and apart and having confronting vertical faces formed with aligned pockets defining a mold cavity when said mold members are together, actuating means for urging said mold members horizontally together and apart, charging means formed for injecting a measured quantity of the food product into said mold cavity, stick-driver means mounted in juxtaposed position to said mold means and oriented in relation to said mold means for inserting an elongated stick endfirst into the food product contained in the mold cavity, and control means formed for operating said actuating and charging and stick-driver means in sequence whereby the food product will be formed into a desired shape and the stick inserted thereinto, the mold members being moved apart thereafter to permit the molded product to fall from the mold cavity, said charging means including a device formed with a passage adapted to communicate said mold cavity with a source of food product under pressure and having a shear plate valve permitting flow through said passage in a first terminal position and cutting off flow through said passage in a second terminal position, said control means being formed to actuate said shear plate valve to said first terminal position at a predetermined point in the cycle of operation of the machine and to actuate said shear plate valve to said second terminal position a timed interval thereafter, said control means being formed to permit adjustment of the duration of said interval for controlling the quantity of food product processing through said passage into the mold cavity while said shear plate valve is in said first terminal position.

9. In a machine for molding ground meat food products and the like into a stick-like handle, a mold charging device comprising a housing having an internal passage adapted for connection to a source of food product under pressure and to a forming mold, a shear plate valve having an elongated plate mounted for reciprocation transversely across said passage and formed with an opening therethrough permitting the food product to flow through the passage when the opening is registered therewith, operating means for reciprocating said plate from passage closed to passage open and back to passage closed position, and adjustable timing means for actuating said operating means to hold the shear plate valve in open condition for a period sufficiently long to allow passage of a desired quantity of the food product through the opening in said plate.

10. A mold charging device of the character defined in claim 9 and wherein said hole in said plate is formed with a sharp rim cooperating with a confronting sharp rim encircling said passage for severing fibers in said food product as said plate moves to closed condition.

11. In a machine for molding ground meat food products and the like onto a stick-like handle, mold means including a pair of mold members mounted for movement together and apart and having confronting vertical faces formed with aligned pockets defining a mold cavity when said mold members are together; said mold cavity including a stick receiving passage located between said mold members at one end of the mold and a meat receiving passage at the opposite end of the mold; actuating means for urging said mold members horizontally together and apart; charging means formed for injecting a measured quantity of the food product into said mold cavity; stick-driver means mounted in juxtaposed position to said mold means and oriented in relation to said mold means for inserting an elongated stick endfirst through said stick-receiving passage into the food product contained in the mold cavity; and control means formed for operating said actuating and charging and stick-driver means in sequence whereby the food product will be formed into a desired shape and the stick inserted thereinto, the mold members being moved apart thereafter to permit the molded product to fall from the mold cavity; said charging means comprising a housing having an internal passage adapted for connection at one end to a source of food product under pressure and communicating at its other end with said mold cavity, said housing being formed with a cylindrical bore opening at one end into said internal passage, a piston mounted for reciprocation in said bore, a pneumatic cylinder connected to said piston for reciprocating the latter in said bore, a pair of elongated plate-like valve members mounted in parallel spaced relation in said housing on opposite sides of said bore transversely across said internal passage, one of said plate-like valve members having a sharp edge movable in close juxtaposed relation to the end of the meat receiving passage of said mold members to shear the charged meat therein, a second pneumatic cylinder connected to said plate-like valve members and operative for effecting joint reciprocation thereof between terminal positions, said plate-like valve members being formed with openings therethrough positioned to provide communication from the intake end of said internal passage to said bore while the valve members are in one terminal position and to provide communication between said bore and said mold cavity when said valve members are in their other terminal position, said control means being formed for actuating said pneumatic cylinders in sequence whereby said valve members will be moved to said first terminal position to admit a measured quantity of product to said bore while blocking off said bore from said mold cavity and then moving said valve means to their second terminal position communicating said bore with said mold cavity and blocking off the inlet end of said passage from said bore and thereafter advancing said piston in said bore so as to inject the measured quantity of product into said mold cavity.

12. In a machine for molding ground meat food products and the like onto a stick-like handle, a charging means as described in claim 11 and wherein said pneumatic cylinder connected to said piston contains adjustable stop means to provide an adjustable stroke of said piston for selectively varying the measured quantity of product injected into said mold cavity.

13. In a machine for molding ground meat food products and the like onto a stick-like handle, charging means comprising a housing formed with an internal passage having an intake end adapted for connection to a source of food product under pressure and an outlet end adapted for connection to a mold cavity, said housing being formed with a cylindrical bore opening at one end into said passage, a piston mounted for reciprocation in said bore, a pneumatic cylinder connected to said piston for reciprocating the latter in said bore, a pair of elongated plate-like valve members mounted in parallel spaced relation in said housing on opposite sides of said bore transversely across said passage, a second pneumatic cylinder connected to said plate-like valve members and operative for effecting joint reciprocation thereof between terminal positions, said plate-like valve members being formed with openings therethrough positioned to provide communication from the intake end of said passage to said bore while the valve members are in one terminal position and to provide communication between said bore and said mold cavity when said valve members are in their other terminal position, said control means being formed for actuating said pneumatic cylinders in sequence whereby said valve members will be moved to said first terminal position to admit a measured quantity of product to said bore while blocking off said bore from said mold cavity and then moving said valve means to their second terminal position communicating said bore with said mold cavity and blocking off the inlet end of said passage from said bore and thereafter advancing said piston in said bore so as to inject the measured quantity of product into said mold cavity.

14. In a machine for molding ground meat food products and the like onto a stick-like handle, mold means including a pair of mold members mounted for movement together and apart and having confronting vertical faces formed with aligned pockets defining an elongated horizontally oriented mold cavity when said mold members are together, said mold members being formed to provide a passage communicating with one end of said mold cavity for inserting a measured quantity of food product thereinto and a smaller passage at the opposite end of said mold cavity located between said mold members for inserting a stick-like handle endfirst into the food product contained in the mold cavity, means for moving said mold members together to define said mold cavity and apart to permit the molded food product to drop therefrom, and stick-driver means mounted in juxtaposed position to said mold means and oriented in relation to said mold means for inserting an elongated stick endfirst through said smaller passage into the food product contained in the mold cavity, said stick-driver means including a trough aligned with said smaller passage and a reservoir formed to contain a supply of said sticks and to deliver such sticks in one-at-a-time order to said trough, spring biased holding means carried on one of said mold members for holding the stick and molded meat in position as the mold members are beginning their retraction from each other and then releasing the stick, a pneumatic ram aligned with said trough and formed for advancing a stick in said trough endfirst through said smaller passage into the mold cavity, and control means for actuating said pneumatic ram when said mold members are together and a desired quantity of food product has entered said mold cavity.

15. A machine for molding ground meat food products and the like onto a stick-like handle, comprising mold means including a pair of mold members mounted for movement together and apart and having confronting vertical faces formed with aligned pockets defining a mold cavity when said mold members are together, actuating means for urging said mold members horizontally together and apart, charging means formed for injecting a measured quantity of the food product into said mold cavity, stick-driver means mounted in juxtaposed position to said mold means and oriented in relation to said mold means for inserting an elongated stick endfirst into the food product contained in the mold cavity, each of said actuating and charging and stick-driver means incorporating pneumatic actuating cylinders, and electrically operated solenoid valves adapted for selectively communicating said pneumatic cylinders with a source of air under pressure, control means formed for operating said actuating and charging and stick-driver means in sequence whereby the food product will be formed into a desired shape and the stick inserted thereinto, the mold members being moved apart thereafter to permit the molded product to fall from the mold cavity, said control means including a series of switching means operatively connected to said solenoid valves for operating the latter in the desired sequence.

16. A machine for molding ground meat food products and the like onto a stick-like handle, comprising mold means including a pair of mold members mounted for movement together and apart and having confronting vertical faces formed with aligned pockets defining a mold cavity when said mold members are together, actuating means for urging said mold members horizontally together and apart, charging means formed for injecting a measured quantity of the food product into said mold cavity, stick-driver means mounted in juxtaposed position to said mold means and oriented in relation to said mold means for inserting an elongated stick endfirst into the food product contained in the mold cavity, each of said actuating and charging and stick-driver means incorporating pneumatic actuating cylinders, electrically operated solenoid valves adapted for selectively communicating said pneumatic cylinders with a source of air under pressure, control means formed for operating said actuating and charging and stick-driver means in sequence whereby the food product will be formed into a desired shape and the stick inserted thereinto, the mold members being moved apart thereafter to permit the molded product to fall from the mold cavity, said control means including a series of relays operatively connected to said solenoid valves for operating the latter in the desired sequence, and adjustable time delay circuits controlling the switching means which operate the solenoid valve for said charging means so as to control the quantity of food product injected into said mold cavity for controlling the weight of the resulting molded product.

References Cited by the Examiner

UNITED STATES PATENTS

| | | | |
|---|---|---|---|
| 2,366,379 | 1/45 | Bemis | 222—221 |
| 2,484,460 | 10/49 | Pedro | 17—32 |
| 2,729,947 | 1/56 | Cheney | 17—32 |
| 2,815,530 | 12/57 | Alexander | 17—1 |
| 2,830,235 | 4/58 | Leonard | 317—141 |
| 2,879,593 | 3/59 | Schwartz | 31—42 |
| 2,929,340 | 3/60 | Topfer | 107—8 |
| 2,980,825 | 4/61 | Frachon | 317—141 |
| 3,099,037 | 7/63 | Blake et al. | 17—1 |

SAMUEL KOREN, *Primary Examiner.*

LUCIE H. LAUDENSLAGER, *Examiner.*